Feb. 19, 1946.  H. PFLEUMER  2,395,293
METHOD OF MAKING HIGH PRESSURE CLOSED CELL RUBBER
Filed Aug. 21, 1941
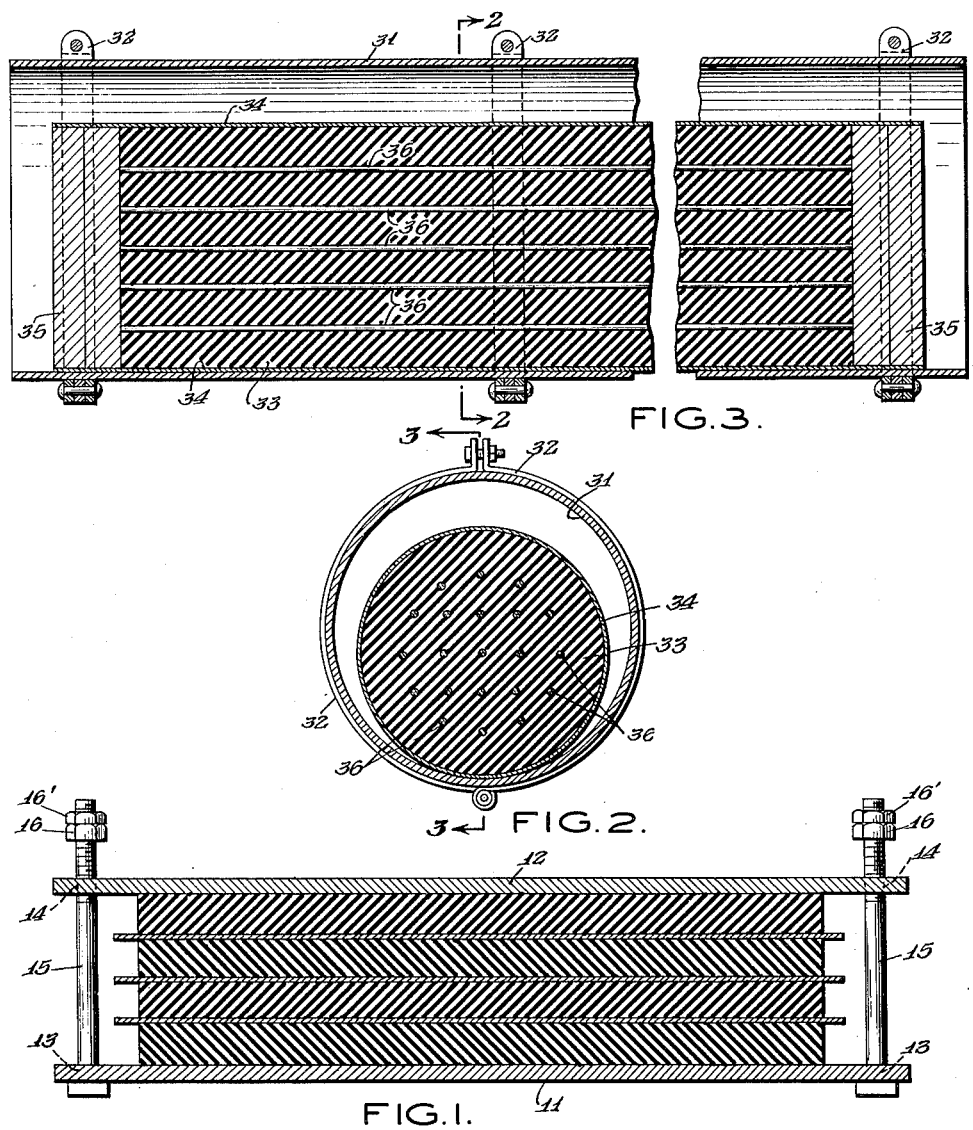
INVENTOR.
Hans Pfleumer
BY
ATTORNEY Patented Feb. 19, 1946

2,395,293

UNITED STATES PATENT OFFICE 2,395,293

METHOD OF MAKING HIGH-PRESSURE CLOSED CELL RUBBER

Hans Pfleumer, New Brunswick, N. J., assignor to Rubatex Products, Inc., New York, N. Y., a corporation of Delaware Application August 21, 1941, Serial No. 407,729

11 Claims. (Cl. 18—53)

My invention relates in general to a novel process for the manufacture of expanded rubber and more particularly to a novel process for manufacturing celltight expanded rubber in which the expanded rubber contains a gas under pressure substantially greater than atmospheric.

Heretofore, in the manufacture of expanded rubber, the rubber mix was first gassed either by external pressure of the order of 3,000 pounds per square inch, or by the release of gas from chemical mixture in the rubber mix.

In either event, the rubber, while being gassed, was confined against expansion until the rubber was thoroughly saturated with the gas at high pressure.

With the rubber thoroughly saturated with the gas, the rubber was partially vulcanized to prevent the escape of the gas from the rubber. In the next stage, the rubber was permitted to expand under the action of the high pressure gas in the rubber to its maximum extent at which the pressure within the rubber was of the order of atmospheric pressure.

The product now fully expanded and in a cellular condition was finally vulcanized or set.

During the expansion in the above described process, the gas pressure within the individual cells fell off as the expansion proceeded to a point where the pressure in the cells of the rubber was substantially equal to atmospheric pressure and any residual pressure within the cells above atmospheric was due to the elasticity of the rubber which tended to prevent complete expansion.

It has heretofore been noted that, when a volume of rubber was carried to complete expansion, there would be a tendency for the rubber to assume a natural set when a stress was imposed which would be of different configuration than the original volume.

Accordingly, the continued working of a piece of expanded rubber would cause a change in its elasticity and in the volume.

My invention contemplates a gassing process for producing a gas expanded rubber product having individual non-communicating gas cells, the gas pressure being considerably greater than atmospheric. A rubber product of this nature is particularly adaptable to shock absorbing applications since the gas pressure within the rubber cells effectively resists an imposed deforming force.

Furthermore, numerous other applications may be found for a cellular rubber expanded in accordance with my process. Thus, for example, as more completely described in my co-pending application Ser. No. 382,378, filed March 8, 1941, I may fabricate a leak-proof tank of a rubber product of these characteristics. As described in this aforementioned application, the wall of the tank is fabricated from a sheet of material containing as a central filler a sheet of expanded rubber having high pressure within the non-communicating cells. Upon perforation, as by a bullet or the like, the cell walls in the immediate vicinity of the perforation are expanded by the internal pressure of the cells and operate, in the novel manner described, to plug the opening against leakage.

In another application of the novel rubber product of my invention, I may form a puncture-proof tire for aircraft or the like by replacing the inner tube of a conventional tire by fillers of gas expanded rubber having individual cells containing gas under high pressure. The advantage of this novel construction is that the tire will be relatively hard and resilient due to the high pressure gas within the expanded rubber and will be puncture-proof in the sense that the passage of a bullet or a pointed object, as a nail, will injure only one portion of the tire and in no way affect the other portions thereof, since the flow of gas is restricted by the walls of the individual cells.

A tire of this form is particularly feasible for aircraft since the wheels are not subject to continuous duty wear, and hence there is no excessive friction which may tend to destroy the rubber.

It is, therefore, a primary object of the present invention to provide a gassing process for expanding soft rubber to a homogeneous structure of non-communicating cells wherein the individual cells contain gas under a comparatively high pressure.

Another object of the present invention is to provide a resilient shock-absorbing product having non-communicating cells, each containing gas under considerable pressure.

A further object of my invention is to provide a mold in which rubber may be partially expanded into cellular form wherein the individual cells contain gas under considerable pressure.

A still further object of my invention is to provide for a gas expanded rubber product particularly adaptable to airplane tires.

These and other objects of my invention will now become apparent from the following specification taken in connection with the accompanying drawing in which:

Figure 1 is an end sectional view of a mold in which rubber may be expanded into cellular sheets, the degree of expansion being adjustable.

Figure 2 is a cross-sectional view of a mold in which cylindrical members of cellular rubber may be fabricated, the individual cells containing gas under high pressure.

Figure 3 is a cross-sectional view of the mold illustrated in Figure 2, taken on line 3—3 of Figure 2.

Generally when soft rubber is completely expanded by a high pressure gas, the ratio of the volume of gas included to the volume of rubber is of the order of 8 to 1. In my novel process, in order to form an expanded rubber product in which the individual cells contain gas under pressure, much greater than atmospheric, I preclude the complete expansion of the rubber and provide additional means for maintaining the rubber in this state during storage or the like.

However, it is obvious that the density of the expanded rubber volume is proportional to the quantity of gas included therein. In the past, various methods have been proposed for making a cellular rubber product which would contain a greatly increased quantity of gas. For fully expanded rubber, however, it is evident that an increase in the quantity of the gas beyond a certain point would result in an expansion which would cause destruction of the individual cell walls and thus form sponge or porous rubber.

Inasmuch as in my novel process, the gas within the individual cell remains at a pressure which is considerably greater than atmospheric, the increased quantity of gas is an advantage in that it permits the expansion of the rubber to a point where it has the same low density as fully expanded rubber of the type heretofore known. The addition of a softener to the rubber to permit increased expansion, when complete expansion is permitted, of course, permits a lower density of rubber but, as is well known in the art, the addition of a softener decreases the tensile strength of the rubber produced and, hence, an inferior produce is the result.

In accordance with the principles of my invention, I have found that the addition of a material to the soft rubber volume to be expanded, which is extremely porous or which has the form of a number of hollow hemispheres, permits the increased absorption of gas and the consequent higher degree of expansion and higher pressures within the cells.

As an example of a material for imparting an artificial porosity to the rubber compound being expanded I have found that diatomaceous matter is particularly desirable. Of course, various other methods may be employed, namely the utilization of a multiplicity of threads extending throughout the entire volume, which threads permit the introduction of gas throughout the innermost portions of the rubber.

Thus by the utilization of any of the named methods for producing artificial voids within the rubber structure, I may increase the quantity of gas within the compound and thus produce the novel rubber of my invention which contains the individual high pressure gas cells.

In order to produce the expanded closed cell rubber in which the individual cells contain gas under high pressure, it is necessary to preclude expansion to atmospheric pressure. This may be accomplished by the use of limiting molds as illustrated in Figures 1, 2, and 3 which preclude by means of the dimensions thereof the expansion of the rubber to a point where the pressure within the individual cells may decrease below that desired.

In Figure 1 there is shown a mold which may be employed to successfully produce rubber sheets of the novel type described in connection with my invention. Thus, the mold illustrated in Figure 1 is normally enclosed within an autoclave of suitable dimensions and having a wall thickness which will permit the introduction of high pressure gas. The mold illustrated comprises essentially a pair of metallic plates 11 and 12 which are placed parallel to each other.

A plurality of perforations 13 and 14 in the lower and upper plates respectively permit the passage of corresponding bolts 15 to which nuts 16 may be secured. The plates are sufficiently loose on the bolts so that they may slide thereon. The rubber compound is introduced into the mold and the plates 11 and 12 are permitted to engage the outer surfaces of the rubber. The gas introduced into the autoclave is then withdrawn to permit the expansion of the rubber which accordingly causes the displacement of the plates 11 and 12.

In order that the expansion of the rubber between the plates be limited so that the resulting pressure within the individual closed cells be considerably greater than atmospheric, the nuts 16 may be placed in a position which will preclude the separation of plates 11 and 12 beyond the desired extent.

Ordinarily, in an autoclave, the rubber introduced into the volume may expand in three dimensions. However, the frictional resistance to expansion created at the contact area between the rubber and the metal plates 11 and 12 will normally preclude this possibility and hence no end stoppers need be provided to preclude expansion parallel to the plates 11 and 12.

The maximum displacement between the plates 11 and 12 may be adjusted by suitably positioning and locking the nuts 16 upon the bolts 15 as, for instance, by lock-nuts 16'. As illustrated in Figure 1, the expansion limiting mold has been adapted to produce three sheets of expanded rubber in which the internal pressure of the cells is considerably greater than atmospheric. Thus three equal volumes of rubber compound 21, 22, and 23 are introduced into the mold and separated by spacers 24 and 25 which may be of thin metal or paper or the like.

Since the three volumes of rubber compound 21 to 23 introduced into the molds are equal, the thicknesses of the resulting sheets will be correspondingly equal. The spacing between the plates 11 and 12 which is determined by the position of the nut 16 is predetermined so that upon expansion, the rubber compound will be confined and thus result in a product having cells containing gas under several atmospheres pressure absolute.

Upon the completion of the expansion process, it is necessary to remove from the mold the expanded rubber sheets thus formed. However, it is obvious that the withdrawal of these sheets would immediately permit the expansion of the gas contained therein and thus the reduction of pressure within the individual cells.

The manner, therefore, in which the withdrawal of the sheets may be accomplished without permitting the further expansion of the gas within the cells will be hereinafter more completely described.

If it is desired to form cellular rubber members of cylindrical form in which the cells contain gas under considerable pressure, the mold illustrated in Figures 2 and 3 may be employed.

This mold comprises essentially a cylindrical metal drum 31 which may be fabricated from sheet metal rolled to the desired form. The metal cylinder 31 is braced against expansion and thus opening by a plurality of circular clamping rind 32 which may be disposed along the surface thereof. Within the cylindrical mold 31 a quantity of rubber is introduced and expanded in the usual manner.

However, in order that the rubber expand in a uniform cylindrical shape, it is desirable that the rubber compound be introduced to the chamber in cylindrical form. Thus, this rubber is partially vulcanized to eliminate the tackiness of the compound and it is rolled into a cylinder 33 by enclosing it within a cylindrically formed sheet of paper 34.

A stopper 35 at each end of the paper cylinder 34 is employed to preclude the expansion of rubber in the axial direction. These stoppers 35 may be braced against axial movement in any suitable manner. During the vulcanizing cycle, and thus, prior to the expansion of the rubber compound 33, the rubber compound expands as a result of its inherent coefficient of thermal expansion.

Since the rubber compound is confined by the paper cylinder, there will first be a tendency for the rubber to be compressed within the cylinder and then to be forced into cylindrical form by the paper. Further expansion will tear the paper and permit the free expansion of the rubber. This final tearing of the paper will, of course, occur during the gas expansion of the rubber.

By utilizing a cylindrical member 31 which may be formed by rolling a sheet of metal with an open seam, the diameter thereof may be made adjustable and may be fixed by the use of clamp rings 32 of desired dimensions. The quantity of rubber 33 introduced into the mold and the degree of expansion are, of course, determined by the size of the mold and the pressure which is to be permitted within the individual cells of the structure.

In order to enhance the absorption of gas by the rubber compound 33, a plurality of perforations or gassing channels 36 are employed throughout the volume.

As in the case of the sheet rubber products formed in the mold illustrated in Figure 1, it is necessary to withdraw the cylindrical expanded rubber from the mold while preventing the further expansion of the product. Accordingly, I refrigerate the partially expanded rubber product within the mold in order that the cell walls become substantially hard so that, when exposed to the atmosphere, it will resist the internal forces imposed by the high pressure gas.

In conventional gassing chambers for manufacturing expanded cellular rubber, means must necessarily be provided for heating the interior of the structure in order to effect vulcanization of the rubber. This is normally accomplished by lining the inner walls of the autoclave with steam coils so that live steam may be circulated therethrough to raise the temperature of the rubber mixture to that required for vulcanization. These coils may be utilized in accordance with my invention for permitting the refrigeration of the rubber mixture subsequent to the vulcanization process. Cooling may also be obtained by drawing off the compressed gas and permitting it to expand in the manner hereinafter described.

Thus, extremely cold air or water may be circulated through these coils, immediately after the vulcanization is complete, to drop the temperature to a value sufficiently low to cause the freezing of the rubber compound. It has been determined by tests that frozen rubber is a crystalline structure which is comparatively durable and thus, when the individual cell walls are frozen and then exposed to the atmosphere, they will be able to withstand the stresses imposed thereon.

Thus, after refrigeration, the expanded rubber product may be removed from the autoclave and, if not to be used immediately, taken to a refrigerator where it may be stored indefinitely. Upon reheating, to room temperature as in normal application, the rubber resumes its original elastic state and will tend to expand. If confined, however, within suitable chambers, this tendency towards expansion may be resisted and a resilient shock absorbing member formed thereby.

In order to enhance the refrigeration and thus the stiffening of the rubber walls, I have found that the addition of a hydro-carbon such as balata in the proportion of 10%–50% of the entire volume effectively improves the ability to stiffen under refrigeration.

Balata exhibits many of the properties of ordinary rubber in that it may be vulcanized and it assumes an elasticity which is similar to that of rubber. However, balata assumes this elastic form within a more limited temperature range than the rubber and accordingly it may readily be rendered unyielding by refrigeration. In fact, the addition of balata to an expanded rubber compound further improves the properties in that gas occluded within balata will not diffuse during considerable periods of time.

It is well known that the expansion of a gas will cause a drop in temperature. Thus, in my novel gassing process, I take advantage of this temperature drop in expanding the high pressure gas within the autoclave to atmospheric pressure. This drop in temperature may be caused to cool the expanded rubber product within the autoclave and hence, by a repetition of these expansion processes, be permitted to refrigerate this compound and thus be removed from the mold without additional expansion.

The cooling process by the use of the expansion of compressed gases may be continued and repeated as frequently as necessary, since the expanded rubber is confined so that its internal pressure is relatively high, for instance of the order of 100 pounds per square inch.

It is, therefore, possible, after the exhaust and expansion of the original gas, to admit gas under pressure into the gassing chamber without affecting the expanded rubber, provided the pressure of the gas is no higher than the internal gas pressure of the rubber.

Thus, for instance, where the internal pressure of the rubber is 100 pounds per square inch, gas under the pressure of 100 pounds per square inch may be admitted to the gassing chamber.

This gas may rapidly be drawn off and its expansion will create a refrigerating effect in a manner which is well known.

After a drop in temperature is achieved by this exhaust and expansion of gas, the process may be repeated as often as is necessary to obtain the desired drop in temperature.

When the original gassing process is completed, the gas at 5,000 pounds per square inch pressure, when exhausted, need not be lost but is, in fact, permitted to expand into a series of tanks which will hold the gas under a pressure which, however, is greatly reduced from the original gassing pressure. This expansion into the tanks, as has been pointed out, creates a cooling effect.

The gas in these storage tanks is, however, under substantially higher pressure than 100 pounds per square inch.

When the gas is now readmitted into the autoclave, it is permitted to expand so that its pressure will drop to 100 pounds per square inch and this expansion once more causes a refrigerating effect.

When the gas is exhausted and permitted to expand again, a temperature drop is obtained.

By a series of repetitions of this process, a desired cooling effect may be obtained.

Of course the expanded rubber products must then be refrigerated until used.

If a tire is to be fabricated for an airplane, a solid rubber case such as is conventionally employed is filled with the refrigerated expanded rubber in which the individual cells have high pressure gas therein. Thus, when the temperature rises to normal and the rubber assumes its normal elasticity, the tire will resist deformation by virtue of the high pressure gas within these cells. The destruction of several cells by perforation will, of course, not affect the rest of the tire in which the gas will remain at considerable pressure.

Hence, this type of tire is an ideal substitute for balloon tires in airplanes. The application of expanded rubber material having high pressure gas within the cells, to airplane tires, to leak-proof tanks and to shock absorbers, are but a few of the applications to which these products may be placed.

Various other modifications will present themselves immediately to those skilled in the art, and, hence, I prefer to be limited not by the disclosure above, but only by the appended claims.

I claim:

1. A method for manufacturing gas-expanded cell-tight rubber, said method comprising the gassing of said rubber under pressure while the same is confined within a mold and partially vulcanizing the said rubber; the removal of the rubber from the gassing means while the rubber is confined in the mold and placing the rubber in a freezing chamber while it is confined within the mold; the removal of the rubber from the freezing chamber and the subsequent removal of the rubber from the mold; confining the rubber and completing the vulcanization thereof.

2. The method of manufacturing cell-tight rubber comprising the admixture of a hydrocarbon with the rubber; the gassing of the rubber under pressure while the same is confined within a mold and partially vulcanizing the said rubber; the removal of the rubber from the gassing means while the rubber is confined in the mold and placing the rubber in a freezing chamber while it is confined within the mold; the removal of the rubber from the freezing chamber and the subsequent removal of the rubber from the mold; confining the rubber and completing the vulcanization thereof.

3. The method of manufacturing cell-tight rubber comprising the admixture of balata with the rubber; the gassing of the rubber under pressure while the same is confined within a mold and partially vulcanizing the said rubber; the removal of the rubber from the gassing means while the rubber is confined in the mold and placing the rubber in a freezing chamber while it is confined within the mold; the removal of the rubber from the freezing chamber and the subsequent removal of the rubber from the mold; confining the rubber and completing the vulcanization thereof.

4. The method of manufacturing a gas expanded cell-tight cellular rubber filler comprising the steps of confining the rubber in a cylindrical form in a wrapping; placing the rubber in a cylindrical mold, and vulcanizing and expanding the rubber by gas under pressure, causing said rubber to break its wrapping and expand to fill said mold while the gas in the cells thereof remain under substantial pressure, freezing the rubber and removing the rubber from the mold; and placing the same in the article to be filled.

5. The method of manufacturing a gas expanded cell-tight cellular rubber filler comprising the steps of confining the rubber in a mold; and vulcanizing and expanding the rubber by gas under pressure, causing said rubber to expand to fill said mold while the gas in the cells thereof remains under substantial pressure; limiting further expansion of the rubber, and placing the same in the article to be filled.

6. The method of manufacturing a gas expanded cell-tight cellular rubber filler comprising the steps of confining the rubber in a mold; and vulcanizing and expanding the rubber by gas under pressure, causing said rubber to expand to fill said mold while the gas in the cells thereof remains under substantial pressure; freezing the rubber to limit further expansion thereof, and placing the same in the article to be filled.

7. The method of manufacturing a gas expanded cell-tight cellular rubber filler comprising the steps of confining the rubber in a mold; and vulcanizing and expanding the rubber by gas under pressure, causing said rubber to expand to fill said mold while the gas in the cells thereof remains under substantial pressure; freezing the rubber to limit further expansion thereof; removing the rubber from the mold, and placing the same in the article to be filled; and permitting the temperature of the rubber to rise.

8. The method of manufacturing a gas expanded cell-tight cellular rubber filler comprising the steps of confining the rubber in a mold; and vulcanizing and expanding the rubber by gas under pressure, causing said rubber to expand to fill said mold while the gas in the cells thereof remains under substantial pressure; freezing the rubber to limit further expansion thereof; removing the rubber from the mold, and placing the same in the article to be filled; and permitting the temperature of the rubber to rise, to cause said rubber to yield to the expanding force of the confined gas and completely fill the article to be filled; and arranging said article to be filled so that the gas within the rubber cells is still under substantial pressure when the rubber is expanded to fill the same.

9. The method of manufacturing cell-tight rubber comprising the admixture of balata with the rubber; the gassing of the rubber under pressure while the same is confined within a mold and fully vulcanizing the said rubber to a soft state; the removal of the rubber from the gassing means while the rubber is confined in the mold and placing the rubber in a freezing chamber while it is confined within the mold; the removal of the rubber from the freezing chamber and the subsequent removal of the rubber from the mold;

confining the rubber and completing the expansion thereof.

10. The method of manufacturing cell-tight rubber comprising the steps of gassing the rubber under pressure while confining the rubber within a mold; completely vulcanizing the rubber to a soft state; removing the rubber from the gassing means while the rubber is confined in the mold and placing the rubber in a freezing chamber while it is confined within the mold; removing the rubber from the freezing chamber; thereafter removing the rubber from the mold; again confining the rubber, and completing the expansion thereof.

11. A method for manufacturing gas-expanded cell-tight rubber, said method comprising gassing the rubber under pressure while confining it within a mold, completely vulcanizing the rubber to a soft state, removing the rubber from the gassing means while the rubber is confined in the mold and placing the rubber in a freezing chamber while it is confined within the mold, removing the rubber from the freezing chamber, removing the rubber from the mold, confining the rubber within a hollow article to be filled and supported thereby while still frozen, and thereafter completing the expansion thereof.

HANS PFLEUMER.